April 19, 1960     A. ROESCH ET AL     2,933,355
BEARING ARRANGEMENT

Filed Dec. 9, 1957     2 Sheets-Sheet 1

INVENTORS
Adolf Roesch and Just Sochlemann
BY
Michael S. Striker
ATTORNEY

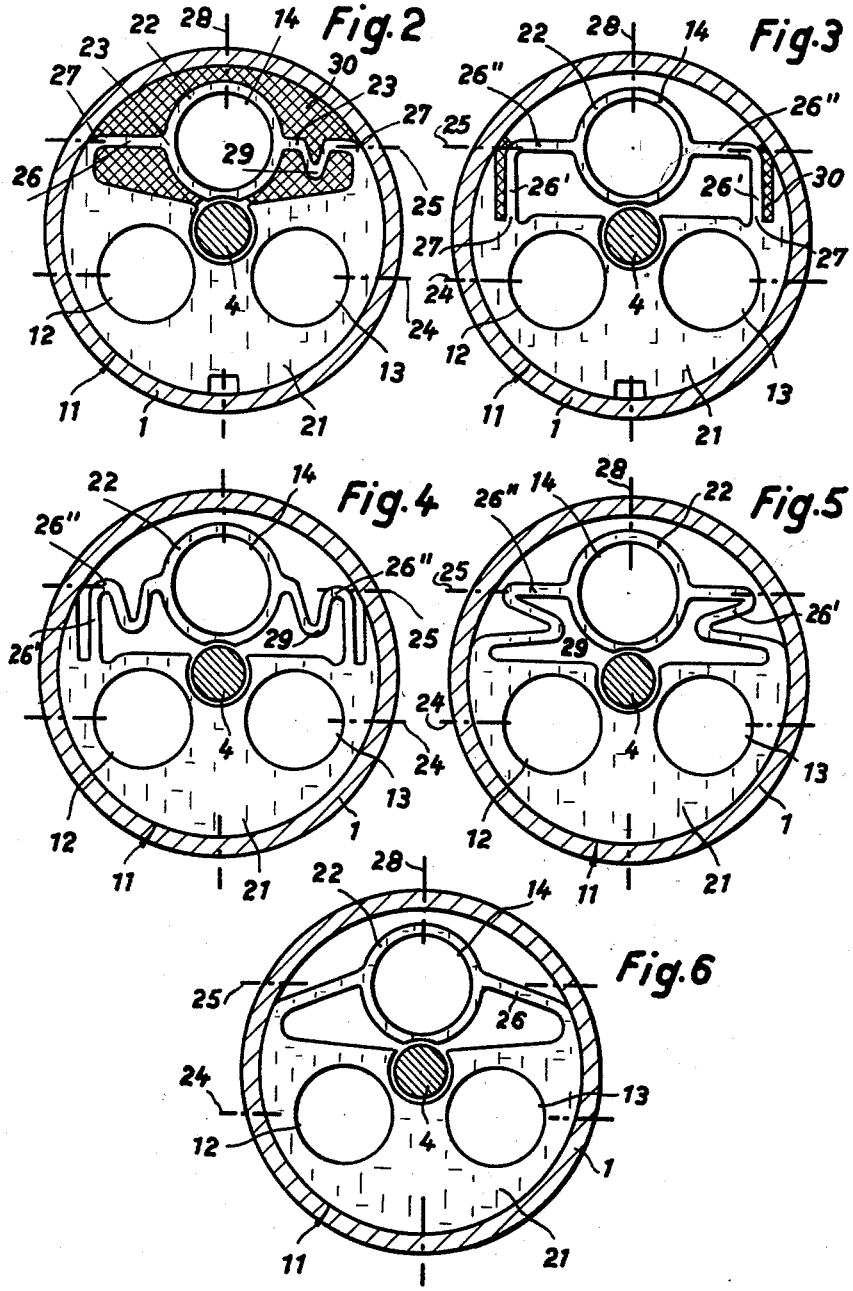

United States Patent Office 2,933,355
Patented Apr. 19, 1960

2,933,355
BEARING ARRANGEMENT

Adolf Roesch, Pforzheim, and Just Soehlemann, Schoenaich, Kreis Boeblingen, Germany; said Soehlemann assignor to said Roesch Application December 9, 1957, Serial No. 701,555

Claims priority, application Germany December 11, 1956

12 Claims. (Cl. 308—203)

The present invention relates to a bearing arrangement, and more particularly to a bearing arrangement for supporting three rotary supporting rollers which support a rotary shaft while rolling on the same.

In arrangements of this type, it is necessary to constantly urge the supporting rollers into rolling engagement with the shaft.

In arrangements according to the prior art, which are particularly applied to the shafts of grinding wheels, one of the rollers is resiliently supported, for example by mounting the respective roller in slots of two discs, and urging the respective roller by a spring toward the rotary shaft.

The constructions according to the prior art have certain disadvantages, since they are incapable of compensating for thermal expansion and contraction of the supporting elements, and do not permit an absolutely accurate support of the rotary shaft when the supporting elements are not manufactured with the greatest precision.

It is the principal object of the present invention to overcome these disadvantages of the prior art constructions and to provide a bearing arrangement of the above-described type which is independent of the geometric accuracy of the mechanical elements, and of thermal expansion and contraction.

With this object in view, the present invention mainly consists in a bearing arrangement comprising two axially spaced supporting members for the three supporting rollers between which the shaft of a grinding spindle is supported, each of the supporting members including a main portion formed with bearing openings for two of the supporting rollers, and a yielding portion supporting the third supporting roller. The yielding portion includes an annular part in which the third supporting roller is mounted for rotation, and two yielding bridge portions which connect the annular part with the main portion.

In a preferred embodiment of the present invention, the bridge portions are corrugated, and extend symmetrical to a plane passing through the axis of the third supporting roller and the axis of the rotatable shaft. This plane is perpendicular to a plane passing through the axes of the other two supporting rollers, and equidistant from the axes of the other two supporting rollers.

Preferably, a yielding material fills the spaces between the two portions of the supporting members, and the space between the supporting members and a surrounding tubular support.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 to Fig. 6 are cross sectional views taken on line II—II in Fig. 1, each of Figs. 2 to 6 illustrating a different embodiment of the present invention.

Figure 1:
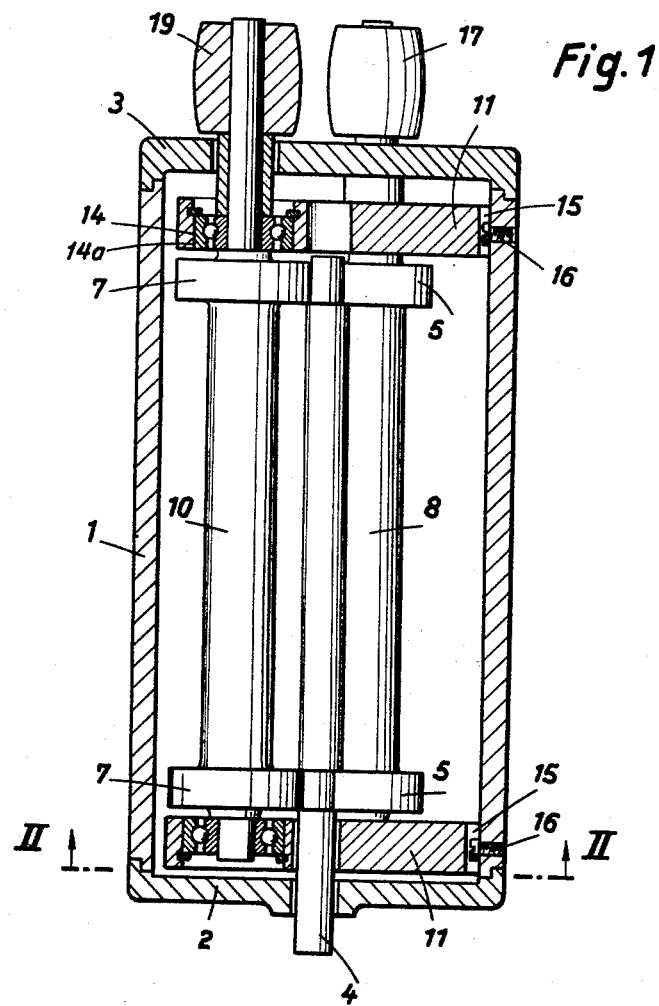
Fig. 1 is an axial sectional view of an embodiment of the present invention.

Referring now to the drawings, and more particularly to Fig. 1, in a tubular support 1, which is closed by end plates 2 and 3, are mounted a pair of supporting members or plates 11. The shape of the supporting plates 11 can be modified as shown in Figs. 2 to 6, but each supporting plate has a main portion 21, and a yielding portion including bridge portions 26 and an annular part 22. The main portion 11 has two bearing openings 12 and 13 in which the two supporting rollers 8 and 9 are mounted. The supporting roller 10 is mounted in the opening 14 of the annular part 22 by means of an anti-friction bearing 14a.

The supporting rollers 8, 9 and 10 have flanges 5, 6 and 7, respectively, which are in rolling engagement with a rotary shaft 4, which is for example the shaft of a rapidly rotating grinding wheel or of a similar tool. The ends of the supporting rollers 8, 9 and 10 pass through corresponding openings in the end plate 3, and carry pulleys 17, 18 and 19 which are advantageously embraced by a common belt by which the supporting rollers 8, 9 and 10 are driven for driving shaft 4. The diameters of the flanges are substantially greater than the diameter of the shaft portion which is engaged by the same.

The two supporting plates 11 are secured against turning movement in the tubular member 1, for example by screws 16 projecting into slots 15 in the supporting plates. Preferably, one of the plates 11 is secured to the tubular support 1 so as to be non-movable in axial direction, whereas the other supporting plate is movable in axial direction so that axial expansion is compensated.

Referring again to Figs. 2 to 6, the main portion 21 is somewhat greater than half of the cross section of the tubular support 1. The annular part 22 is spaced from the inner surface of the support 1 and from the main portion 21 of the respective support plate 11. The axis of the annular part 22 is also the axis of the supporting roller 10, and the axes of the circular openings 12 and 13 coincide with the axes of the supporting rollers 8 and 9. A first plane 24 passing through the axes of the openings 12 and 13 is perpendicular to a second plane 28 passing through the axis of the opening 14 perpendicular to the first plane and equidistant from the axes of the openings 12 and 13. Plane 28 passes through the axis of shaft 4.

The yielding bridge portions 26 are connected to the annular part 22 at the points 23, and to the main portion 21 at the points 27. In the embodiment of Fig. 2 the bridge portions 26 are located in a plane 25 parallel to plane 24. The bridge portions 26 have the effect of leaf springs so that the annular part 22, and thereby the supporting roller 10, are resiliently supported for movement in radial direction with respect to the axis of the shaft 4. In contrast thereto, the main portion 21 is rigid and will resist forces acting from shaft 4 or from the tubular support 1. Consequently, the bridge portions 26 cannot be influenced by a tension force which may be produced by the tubular support 1.

Fig. 2 actually shows two modifications. On the right side of Fig. 2 is a bridge portion provided which has a corrugation 29 by which the resiliency of the respective bridge portions is increased. It will be understood that either or both bridge portions are corrugated, or both bridge portions are straight.

A filling material 30, for example oil-resistant rubber vulcanized to the supporting plates 11, advantageously fills the spaces between the supporting plates and the tubular support 1.

In the modified embodiment of Fig. 3, each bridge portion has a portion 26″ located in plane 25, and another portion 26', respectively located in a plane parallel to plane 28. The portions 26' increase their length at the same rate as the distance between the axis of the annular part 22 and the axis of shaft 4. Consequently, the pressure between the flanges 5, 6 and 7 and the shaft 4 is independent of thermal expansion of the elements of the device.

As shown in Fig. 4, corrugations can be provided in the bridge portions 26" to make the resilient bridge portions softer.

In the embodiment of Fig. 5 the portions 26' are provided with corrugations.

In the embodiment of Fig. 6, the bridge portions 26 are inclined and extend in substantially radial direction with respect to the annular part 22. During thermal expansion, the bridge portions move parallel to the plane 28 so that thermal expansion and contraction has practically no influence on the pressure between the rollers 8, 9 and 10 and shaft 4.

It will be noted that in all embodiments the bridge portions are symmetrical to the plane 28 so that shaft 4 is urged by supporting roller 10 symmetrically against the two supporting rollers 8 and 9.

The supporting plates 11 are preferably produced by precision casting.

It will be understood that each of the elements described above, or two or more together, may also find a useful application in other types of bearing arrangements differing from the types described above.

While the invention has been illustrated and described as embodied in a bearing arrangement for supporting three supporting rollers rolling on a rotary shaft, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications.

What is claimed as new and desired to be secured by Letters Patent is:

1. Bearing arrangement for three supporting rollers supporting a rotary shaft, the bearing arrangement comprising, in combination, a support; a pair of supporting members spaced in axial direction of the supporting rollers and of the shaft, each of said supporting members having a main portion mounted on said support and formed with two bearing openings for supporting said supporting rollers for rotation, the axes of said two bearing openings being located in a first plane, each of said supporting members having a yielding portion including an annular part for supporting the third supporting roller for rotation and being spaced from said main portion and from said support, and two yielding bridge portions integrally connecting said annular part with said main portion and resiliently supporting said annular part on said main portion for movement relative to said support and said main portion, said bridge portions being symmetrical to a second plane passing through the axis of said annular part perpendicular to said first plane and equidistant from the axes of said two bearing openings whereby a shaft rotatably supported between the three supporting rollers, and having its axis located in said second plane, is urged into frictional engagement with said supporting rollers.

2. A bearing arrangement as set forth in claim 1 wherein said bridge portions are at least partly located in a plane parallel to said first plane and perpendicular to said second plane.

3. A bearing arrangement as set forth in claim 1 wherein said bridge portions are connected, respectively to said main portion at points located in a plane parallel to said first plane and adapted to pass through the shaft which is supported by said supporting rollers.

4. A bearing arrangement as set forth in claim 3 wherein each of said yielding bridge portions has a first portion connected to said annular part and located in a plane parallel to said first plane and perpendicular to said second plane, and a second portion connected to said main portion and located in a plane parallel to said second plane and perpendicular to said first plane.

5. A bearing arrangement as set forth in claim 1 wherein said bridge portions extend in substantially radial directions with respect to the axis of said annular part, and have inner ends connected to said annular part, and outer ends connected to said main portion.

6. A bearing arrangement as set forth in claim 1 wherein said bridge portions are formed with transverse corrugations to increase the resiliency thereof.

7. A bearing arrangement as set forth in claim 1 wherein said bridge portions have a corrugated portion located in a plane parallel to said first plane.

8. Bearing arrangement for three supporting rollers supporting a rotary shaft, the bearing arrangement comprising, in combination, a tubular support; a pair of supporting members spaced in axial direction of the supporting rollers and of the shaft, each of said supporting members having a main portion formed with two bearing openings for supporting said supporting rollers for rotation, the axis of said two bearing openings being located in a first plane, each main portion having a curved outer surface extending through an angle greater than 180° and engaging the inner surface of said tubular support, each of said supporting members having a yielding portion including an annular part for supporting the third supporting roller for rotation and being spaced from said member and two yielding bridge portions integrally connecting said annular part with said main portion and resiliently supporting said annular part on said main portion for movement relative to said support and said main portion, said bridge portions being symmetrical to a second plane passing through the axis of said annular part perpendicular to said first plane and equidistant from the axes of said two bearing openings whereby a shaft rotatably supported between the three supporting rollers, and having its axis located in said second plane, is urged into frictional engagement with said supporting rollers.

9. Bearing arrangement for three supporting rollers supporting a rotary shaft, the bearing arrangement comprising, in combination, a pair of supporting discs spaced in axial direction of the supporting rollers and of the shaft, each of said supporting discs having a main portion formed with two bearing openings for supporting said supporting rollers for rotation, the axis of said two bearing openings being located in a first plane, each of said supporting discs having a yielding portion including an annular part for supporting the third supporting roller for rotation and two yielding bridge portions connecting said annular part with said main portion, said bridge portions being symmetrical to a second plane passing through the axis of said annular part perpendicular to said first plane and equidistant from the axes of said two bearing openings whereby a shaft rotatably supported between the three supporting rollers, and having its axis located in said second plane, is urged into frictional engagement with said supporting rollers; a tubular support surrounding said pair of disc members, the inner surface of said tubular support being in engagement with the periphery of said main portions of said supporting discs; and a yielding material located in the spaces between said bridge portions, said annular parts, said main portions, and the inner surface of said tubular support.

10. Bearing arrangement for three supporting rollers supporting a rotary shaft, the bearing arrangement comprising, in combination, a pair of supporting discs spaced in axial direction of the supporting rollers and of the shaft, each of said supporting discs having a main portion formed with two bearing openings for supporting said supporting rollers for rotation, the axis of said two bearing openings being located in a first plane, each of said supporting discs having a yielding portion including an annular part for supporting the third supporting roller for rotation and two yielding bridge portions connecting said annular part with said main portion, said bridge portions being symmetrical to a second plane passing through the axis of said annular part perpendicular to said first plane and equidistant from the axes of said two bearing openings whereby a shaft rotatably supported between the three supporting rollers, and having its axis located in said second plane, is urged into frictional engagement with said supporting rollers; a tubular support surrounding said pair of disc members, the inner surface of said tubular support being in engagement with the periphery of said main portions of said supporting discs; and a yielding material filling at least part of the spaces between said supporting plates and the inner surface of said tubular support.

11. Bearing arrangement for three supporting rollers supporting a rotary shaft, the bearing arrangement comprising, in combination, a support; a pair of supporting members spaced in axial direction of the supporting rollers and of the shaft, each of said supporting members having a main portion mounted on said support and formed with two bearing openings for supporting said supporting rollers for rotation, the axes of said two bearing openings being located in a first plane, each of said supporting members having a yielding portion including an annular part for supporting the third supporting roller for rotation and being spaced from said main portion and from said support, and two yielding bridge portions integrally connecting said annular part with said main portion and resiliently supporting said annular part on said main portion for movement relative to said support and said main portion, said bridge portions being symmetrical to a second plane passing through the axis of said annular part perpendicular to said first plane and equidistant from the axes of said two bearing openings whereby a shaft rotatably supported between the three supporting rollers, and having its axis located in said second plane, is urged into frictional engagement with said supporting rollers; and a yielding material located in the space between said bridge portions, said annular part, and said main portion of each supporting member.

12. Bearing arrangement for three supporting rollers supporting a rotary shaft, the bearing arrangement comprising, in combination, a support; a pair of supporting members spaced in axial direction of the supporting rollers and of the shaft, each of said supporting members having a first part formed with two bearing openings for supporting two of the supporting rollers for rotation, the axes of said two bearing openings being located in a first plane, each of said supporting members including a second part formed with a third bearing opening for supporting the third supporting roller, and two yielding bridge portions integrally connecting said second part with said first part and resiliently connecting said second part to said first part spaced from the same for movement relative to said first part, said bridge portions being symmetrical to a second plane passing through the axis of said third bearing opening perpendicular to said first plane and equidistant from the axes of said two bearing openings, one of said parts being mounted on said support, and the other of said parts being spaced from said support and movable relative to the same whereby a shaft rotatably supported between the three supporting rollers and having its axis located in said second plane, is urged into frictional engagement with said supporting rollers.

References Cited in the file of this patent
UNITED STATES PATENTS
2,778,227     Roesch _____ Jan. 22, 1957